United States Patent [19]

Jackson et al.

[11] Patent Number: 5,193,202
[45] Date of Patent: Mar. 9, 1993

[54] PROCESSOR ARRAY WITH RELOCATED OPERAND PHYSICAL ADDRESS GENERATOR CAPABLE OF DATA TRANSFER TO DISTANT PHYSICAL PROCESSOR FOR EACH VIRTUAL PROCESSOR WHILE SIMULATING DIMENSIONALLY LARGER ARRAY PROCESSOR

[75] Inventors: James H. Jackson; Ming-Chih Lee, both of Cary, N.C.

[73] Assignee: Wavetracer, Inc., Acton, Mass.

[21] Appl. No.: 529,947

[22] Filed: May 29, 1990

[51] Int. Cl.⁵ .................. G06F 15/80; G06F 12/06
[52] U.S. Cl. .................. 395/800; 364/231.9;
364/228.2; 364/232.1; 364/245.7; 364/255.5;
364/256.6; 364/262.1; 364/931.01; 364/931.46;
364/946.8; 364/946.7; 364/261.2; 364/955.1;
364/961.2; 364/DIG. 1; 395/375; 395/400
[58] Field of Search .............. 395/375, 325, 500, 400, 395/425, 725, 800

[56] References Cited

U.S. PATENT DOCUMENTS

| | | | |
|---|---|---|---|
| 3,597,744 | 8/1971 | Case | 340/172.5 |
| 3,891,836 | 6/1975 | Lee | 235/151.12 |
| 3,970,993 | 7/1976 | Finnila | 340/172.5 |
| 4,011,545 | 3/1977 | Nadir | 340/172.5 |
| 4,247,892 | 1/1981 | Lawrence | 364/200 |
| 4,507,726 | 3/1985 | Grinberg et al. | 364/200 |
| 4,598,400 | 7/1986 | Hillis | 370/60 |
| 4,621,339 | 11/1986 | Wagner et al. | 364/900 |
| 4,667,308 | 5/1987 | Hayes et al. | 364/900 |
| 4,697,247 | 9/1987 | Grinberg et al. | 364/713 |
| 4,709,327 | 11/1987 | Hillis et al. | 364/200 |
| 4,720,780 | 1/1988 | Dolecek | 364/200 |
| 4,729,095 | 3/1988 | Colley et al. | 364/200 |
| 4,739,474 | 4/1988 | Holsztynski | 364/200 |
| 4,739,476 | 4/1988 | Fiduccia | 364/200 |
| 4,766,534 | 8/1988 | DeBenedictis | 364/200 |
| 4,773,038 | 9/1988 | Hillis et al. | 364/900 |
| 4,791,567 | 12/1988 | Cline et al. | 364/412.13 |
| 4,796,199 | 1/1989 | Hammerstrom et al. | 364/513 |
| 4,805,091 | 2/1989 | Thiel et al. | 364/200 |
| 4,809,202 | 2/1989 | Wolfram | 364/200 |
| 4,809,346 | 2/1989 | Shu | 382/49 |
| 4,809,347 | 2/1989 | Nash et al. | 382/49 |
| 4,811,210 | 3/1989 | McAulay | 364/200 |
| 4,811,214 | 3/1989 | Nosenchuck et al. | 364/200 |
| 4,814,973 | 3/1989 | Hillis | 364/200 |
| 4,814,980 | 3/1989 | Peterson et al. | 364/200 |
| 4,827,403 | 5/1989 | Steele, Jr. et al. | 364/200 |
| 4,905,143 | 2/1990 | Takahashi et al. | 364/200 |
| 4,939,642 | 7/1990 | Blank | 364/200 |
| 4,996,648 | 2/1991 | Jourjine | 364/513 |
| 5,058,001 | 10/1991 | Li | 364/200 |
| 5,123,109 | 6/1992 | Hillis | 395/800 |
| 5,129,077 | 7/1992 | Hillis | 395/500 |

OTHER PUBLICATIONS

"The Third Dimension", Michael J. Little and Jan Grinberg, BYTE, Nov. 1988, pp. 311–319.

Primary Examiner—Lawrence E. Anderson
Assistant Examiner—Ken S. Kim
Attorney, Agent, or Firm—Weingarten, Schurgin, Gagnebin & Hayes

[57] ABSTRACT

A parallel processing system including a virtual processing instruction and address generator, for generating processor cell instructions to a parallel processing array such as a multi-dimensional processor array which may have fewer processor cells than the number of nodes in the problem space. The system partitions the memory of each physical processor cell into several equal sections, each section being associated with one node of the problem space. The instruction generator then produces a sequence of processor cell instructions for each node of the given problem space, with appropriate address modifications for each sequence of instructions provided by an address relocation circuit.

10 Claims, 8 Drawing Sheets

INTERPROCESSOR COMMUNICATION IN A POSITION COORDINATE DIRECTION

PROCESSOR ARRAY WITH RELOCATED OPERAND PHYSICAL ADDRESS GENERATOR CAPABLE OF DATA TRANSFER TO DISTANT PHYSICAL PROCESSOR FOR EACH VIRTUAL PROCESSOR WHILE SIMULATING DIMENSIONALLY LARGER ARRAY PROCESSOR

FIELD OF THE INVENTION

This invention relates to computer systems and, more particularly, to a parallel processing system.

BACKGROUND OF THE INVENTION

Natural phenomena such as electric and magnetic fields, fluid flows, sound waves, and heat flow are, at any given moment in time, represented as spatially distributed data in a three dimensional manner by a number or set of numbers whose indices represent spatial positioning along three mutually orthogonal axes. On occasion, a fourth dimension, namely time, must also be considered. To date, scientists and other computer users wishing to solve partial differential equations that involve spatially distributed data such as Poisson's or Maxwell's equations have had limited data processing capabilities because prior art Processor systems and processor arrays have been limited to two-dimensional architectures.

Prior art attempts at solving three-dimensional equations utilizing purely one or two-dimensional arrays have yielded processing systems requiring a large amount of "processor overhead" to calculate an index or address pointer to the second or third dimension of the spatial data which must be stored in memory and not in a processor. For example, in a traditional single processor computer, computing the X and Z dimension indices requires up to three multiplications and two addition steps. On a two-dimensional computer, although the X and Y axes are directly accessible, the Z pointer must be calculated which still requires up to one multiplication and one addition.

Prior art attempts at dealing with three-dimensional data also include the utilization of an interconnection arrangement such as that disclosed in U.S. Pat. No. 4,814,973 in which routers may be instructed to switch data between processor cells in a fashion that mimics the behavior of a three-dimensional processor array. Routers, however, require a large amount of processor overhead to move data between the various processor cells. In addition, supporting control circuitry is required to perform the switching function. System throughput or bandwith is significantly compromised by the router overhead, and system cost and reliability are compromised due to the necessity of including the routers and associated control circuitry.

Additionally, many parallel processing problems require more problem nodes than the number of available processor cells in the processor array. In such situations, it is desirable to avoid requiring the application programmer to adjust the problem space to fit a given processor array. Rather, the application programmer should be insulated from restrictions in the size of the processor array and should have to specify only the size of the problem space. Further, it is necessary to be able to processing programs on any size processor array to maintain compatibility between various processor systems having varied processor array sizes.

SUMMARY OF THE INVENTION

This invention features a parallel processing system including a virtual processing address and instruction generator for generating processor instructions to a parallel processing array such as a multi-dimensional processor array which may have fewer processor cells than the number of nodes in the problem space.

In a preferred embodiment, the processing system partitions the memory of each processor cell into several equal sections, each of which is associated with a node of the problem space. The instruction generator then produces one sequence of processor cell instructions for each sub-space of the given problem space, with appropriate address modifications for each sequence of instructions provided by the address generator. In this manner, a parallel processing array may solve a problem having more problem nodes than there are processor cells in the processor array without memory swapping.

DESCRIPTION OF THE DRAWING

These and other features of the present invention will be better understood by reading the following detailed description of the invention, taken together with the drawing, wherein.

DETAILED DESCRIPTION OF THE INVENTION

Figure 1:
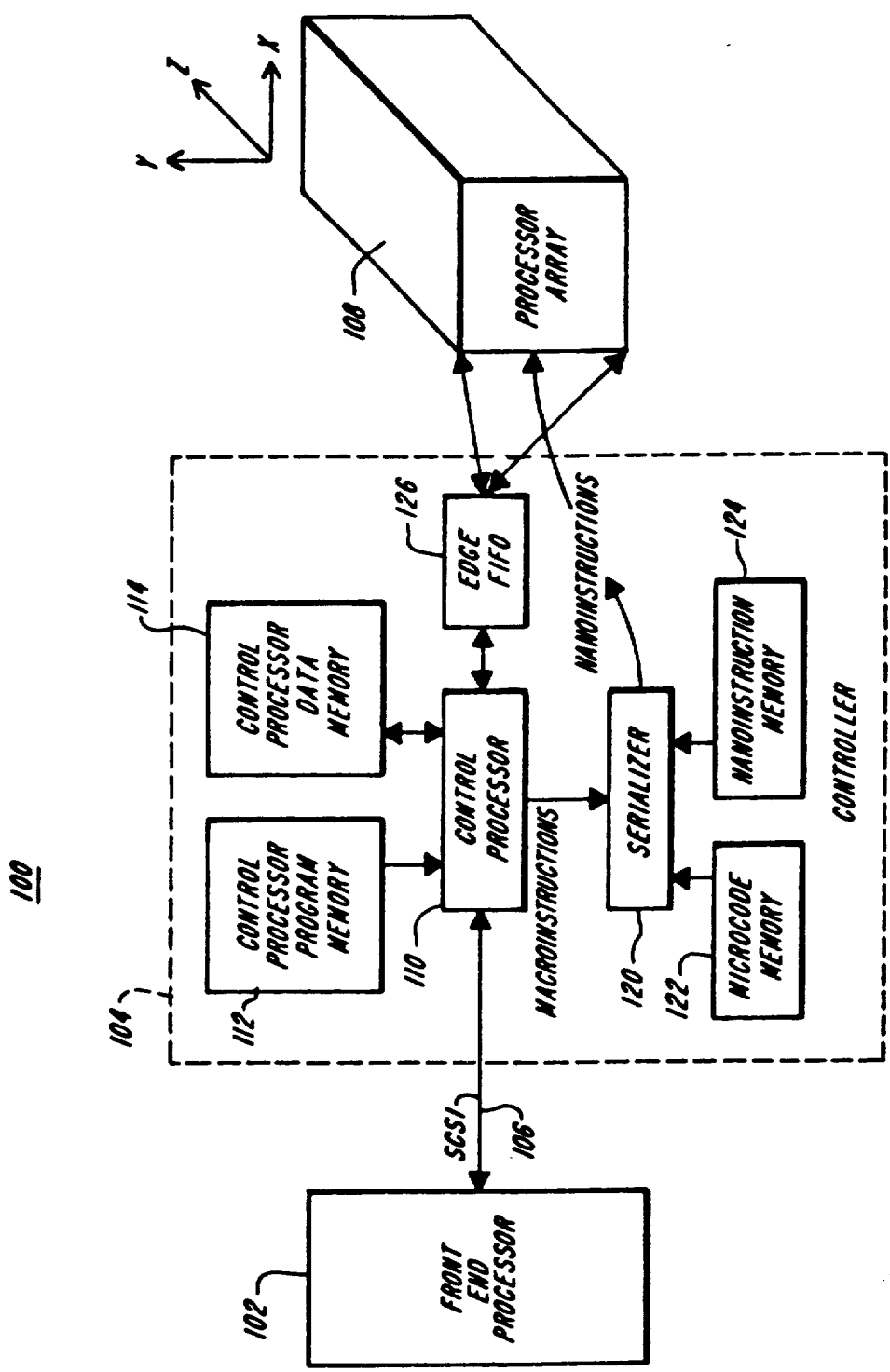
FIG. 1 is a schematic representation of a multi-dimensional parallel processing system and processor array incorporating the control processor and virtual processing address and instruction generator according to this invention.

FIG. 1 illustrates the multi-dimensional processor system 100 of the present invention incorporating a plurality of processor cells. The system includes an appropriate front end processor 102 which serves as a command preprocessor interfacing with processor controller 104 by means of an interface such as a small computer system interface (SCSI) 106. In the preferred embodiment, front end processor 102 is a conventional computer operating under control of a Unix TM operating system. An example of such a front end processor is a Sun workstation available from Sun Microsystems, Front end preprocessor 102 includes a conventional C compiler as well as a preprocessor for the C compiler which allows the system to compile and execute programs written using parallel processing extensions to the C language.

Processor controller 104 provides intermediary processing functions between front end processor 102 and processor array 108. Controller 104 includes control processor 110 which operates under control of a control processor program stored in control processor program memory 112. An example of such a parallel processing system is disclosed in copending U.S. patent application Ser. No. 07/530,027, filed May 20, 1990 entitled MULTI-DIMENSIONAL PROCESSOR SYSTEM AND PROCESSOR ARRAY WITH MASSIVELY PARALLEL INPUT/OUTPUT and copending U.S. Pat. No. 5,530,027, issued Jul. 21, 1992 entitled DIMENSIONALLY RECONFIGURABLE MULTIDIMENSIONAL PROCESSOR ARRAY both of which are incorporated herein by reference.

Front end processor 102 communicates with control processor 110, sending commands to and reading data from the control processor in response to selected commands. Each command normally describes word-oriented unary or binary operations such as ones complement or multiplication. Control processor 110 identifies such commands and reformats them as a sequence of word oriented commands called macroinstructions. Macroinstructions are transferred to address and instruction generator which will be referred to as serializer 120 by initializing registers located within the serializer. Serializer 120 operates under control of microcode 122 and converts each word oriented macroinstruction into a sequence of bit-oriented commands called nanoinstructions, each of which is a processor cell instruction comprised of memory address bits and control bits. The serializer transmits each sequence of nanoinstructions that it produces to all processors of processor array 108. Nanoinstruction memory 124 contains a table of nanoinstruction templates that serializer 120 accesses to form the nanoinstructions for the processor array.

Control processor 110 passes data directly to and from serializer 120 and passes data to and from processor array 108 through bidirectional edge FIFO 126. Similarly, communication with front end processor 102 is through the small computer system interface 106. Control processor 110 receives commands to initialize processor array 108, and controls input/output transfers between the processor array, the front end processor, and other peripherals such as standard or optional swapping RAM and optional I/0 devices.

Figure 2:
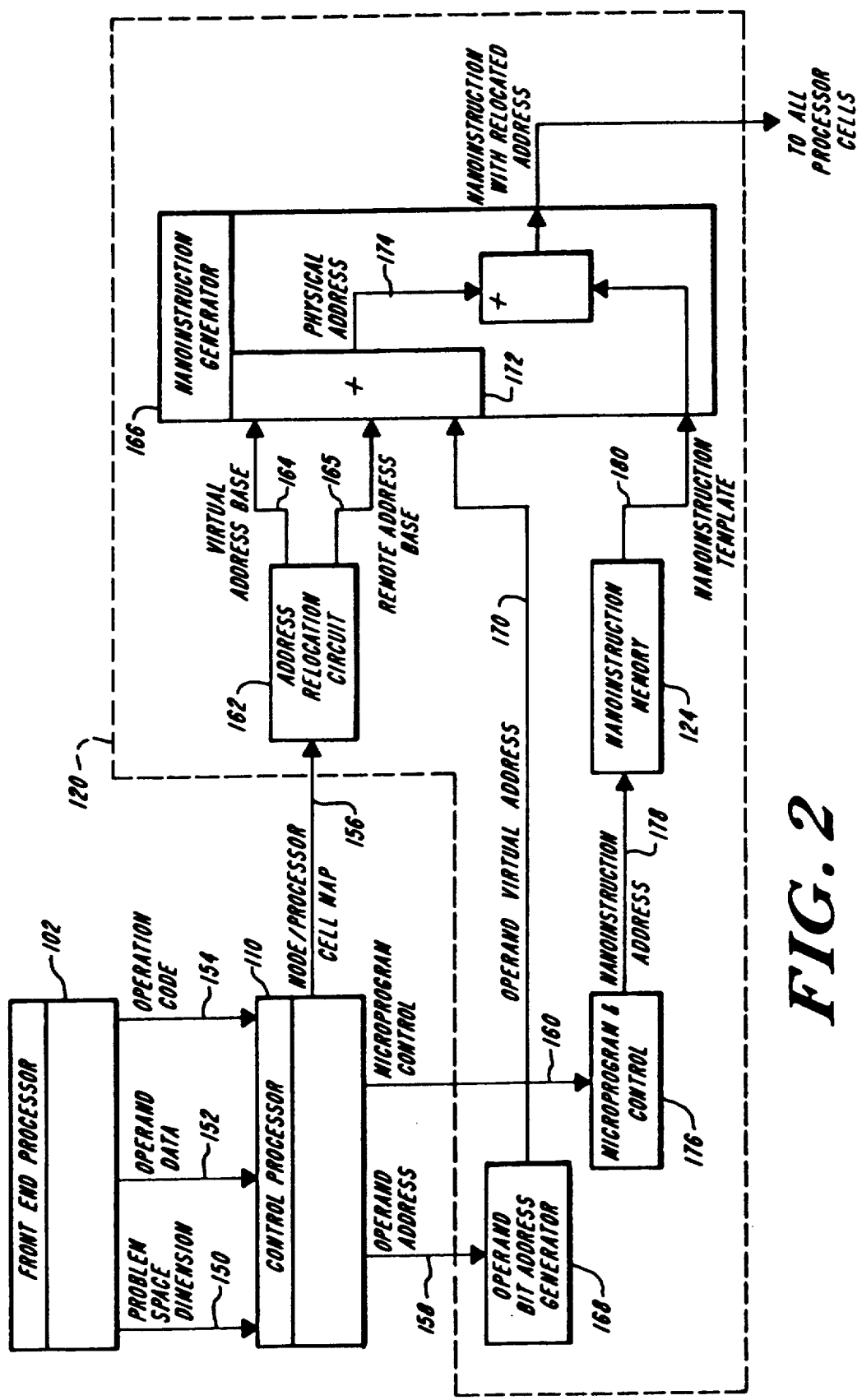
FIG. 2 is a more detailed block diagram of the address and instruction generator of the present invention.

Serializer 120 is shown in greater detail in the block diagram of FIG. 2 wherein the serializer receives input signals from control processor 110, which in turn receives input from front end processor 102.

Front end processor 102 initializes the system by transmitting problem space dimensions 150, as well as additional initialization information, to control processor 110. Control processor 110 responds to this information by loading registers within serializer 120 to describe to the serializer a map 156 of the problem nodes associated with each processor cell. The address relocation circuit 162 receives map 156 and uses it to generate the values of the virtual address base 164 and remote address base 165 during the processing of subsequent information from front end processor 102.

Front end processor 102 then proceeds to control the system by sending commands to control processor 110. Such commands consist of an operation code 154 and operand data 152. Operand bit address generator 168 receives the operand address data 158 from control processor 110 and provides the nanoinstruction generator 166 with the virtual address of the operand bits to be processed by the processor array over signal path 170. Summing circuitry 172 of the nanoinstruction generator 166 sums each virtual address 170 with either the virtual address base 164 or the remote address base 165, depending on the operation being performed on the current operand bit in each of the processor cells, to form the physical processor cell memory address 174 of the operand bit to be processed.

The control processor also decodes operation code 154 and operand data 152 to produce microprogram control signals 160, which it sends to microprogram and control unit 176. Microprogram and control unit 176 responds to these signals by producing nanoinstruction table addresses 178, each of which it uses to address nanoinstruction memory 124 to obtain a nanoinstruction template 180 to send to nanoinstruction generator 166. Microprogram and control unit 176 also generates control information that synchronizes operand bit address generator 168, address relocation circuit 162, and nanoinstruction generator 166 with its own operation. Nanoinstruction generator 166 adds each physical address 174 that it forms as the sum of a virtual address base 164 or a remote address base 165 with a virtual address 170, to the address bits of the corresponding nanoinstruction template 180, to produce each nanoinstruction 182. Each nanoinstruction 182 contains both the physical address of a bit in the memory of each processor cell and control bits that describe operations to be performed on that bit in each processor cell. The nanoinstruction generator 166 broadcasts each nanoinstruction 182 that it produces to all processor cells in the array.

Figure 3:
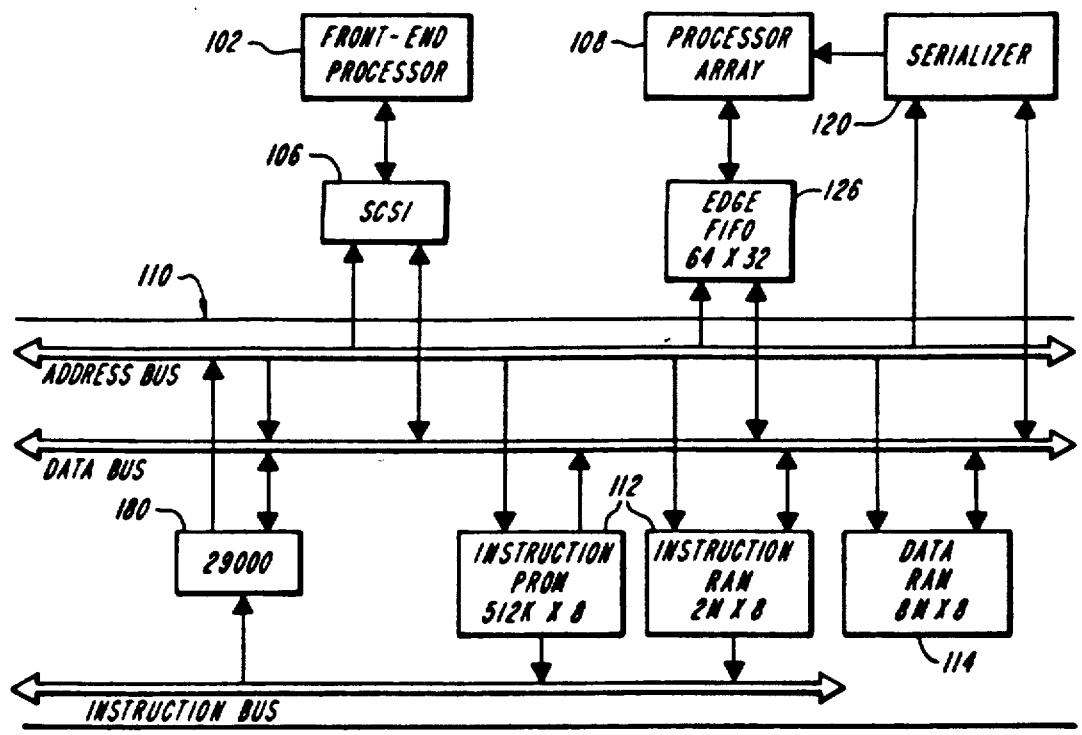
FIG. 3 is a more detailed block diagram of the control processor of FIG. 1.

Front end processor 102 communicates with control processor 110 by sending word-oriented commands to the control processor. Control processor 110 identifies such commands, and reformats them as a sequence of macroinstructions. Such a control processor 100 is shown in the more detailed block diagram of FIG. 3 and includes microprocessor 180 which is an AMD-29000 processor operating under control of control processor program PROM and RAM 112. Control processor data RAM 114 provides temporary data and processor variable storage to microprocessor 180.

To allow a given user program to run unmodified on various size processor arrays, the application programmer must not be required to allocate memory for virtual processing. Indeed, the application program is insulated from the constraints of the number of physical processor cells in a given processor array. Instead, the application program merely defines the X, Y, and Z dimensions of the desired problem space. The control processor then measures the size of the processor array and computes the set of virtual processors to be assigned to each physical processor, which is called the territory of a physical processor cell, from the given dimensions of the problem space and the number of processors along each edge of the processor array. These territory dimensions, which themselves may be multi-dimensional such as in the preferred embodiment wherein 3-dimensions are assumed, are derived as follows:

$$X_t = \frac{X}{s_x}, \; Y_t = \frac{Y}{s_y}, \text{ and } Z_t = \frac{Z}{s_z}$$

where $X_t$, $Y_t$ and $Z_t$ are the dimensions of the territory of each physical processor cell, X, Y and Z are the dimensions of the problem space, and $s_x$, $s_y$ and $s_z$ are the dimensions of the array in physical processors.

The serializer should broadcast a useful nanoinstruction to each processor cell of the processor array once during every nanoinstruction cycle whenever it has unprocessed input available to it from the control processor. The serializer must not only produce a nanoinstruction sequence for each macroinstruction received from the control processor, but must also repeat the nanoinstruction sequence for each virtual processor which has been previously mapped into each physical processor cell, modifying the address for each nanoinstruction as necessary. The address and instruction generator must also take into account that more than one physical processor cell may be involved when two virtual processors must communicate with one another.

Accordingly, to produce each nanoinstruction sequence corresponding to a given macroinstruction received from the control processor, the address and instruction generator of the instant invention must calculate the physical address of the operand to include in each nanoinstruction that it produces, evaluate conditions to determine which microcode instruction to execute and, consequently, which nanoinstruction to produce during the next cycle. The serializer must then repeat each nanoinstruction sequence that it produces with appropriate modifications for each virtual processor in the territory of a physical processor cell.

Figure 4:
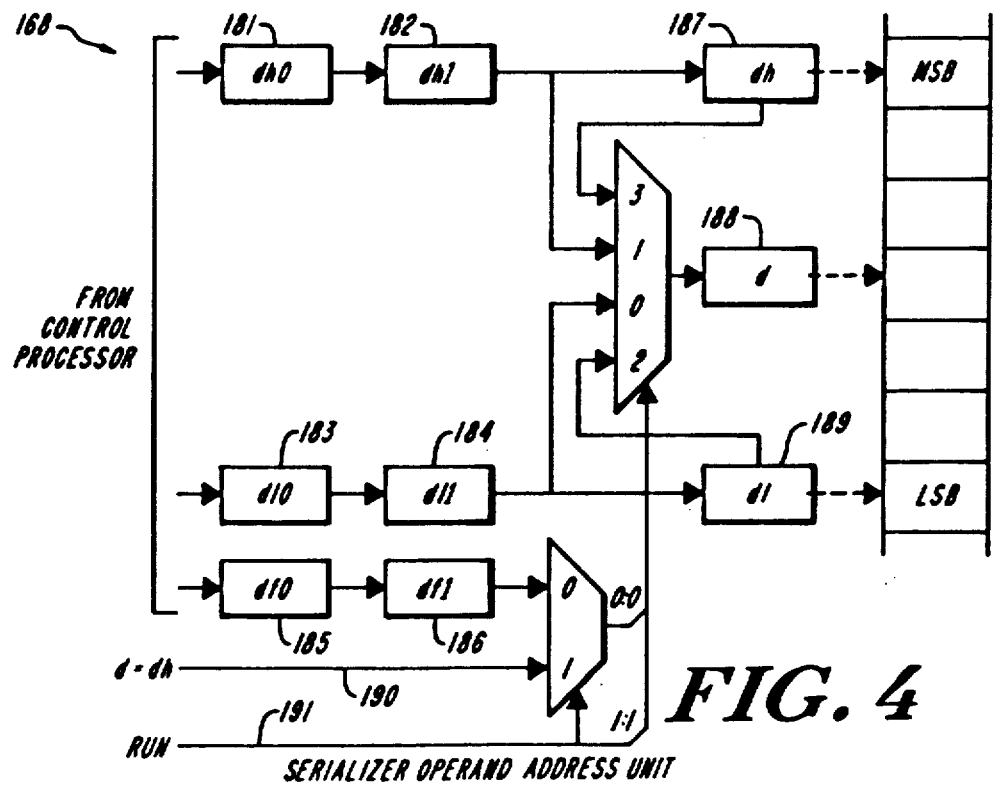
FIG. 4 is a more detailed block diagram of the operand address generator of FIG. 2.

The instruction and address generator 120 of the instant invention contains five operand address generators such as address generator 168, FIG. 4, shown for the d operand. There are three operand address units for the macroinstruction operands d, e, and f and two for temporary variables t and u. Each operand address generator 168 includes two 16-bit high address registers 181 and 182, two 16-bit low address registers 183 and 184, and two 1-bit initialization flag registers 185 and 186. The first of each of these registers is loaded directly by the control processor, whereas the second register is loaded from the first register by the serializer to allow the serializer to process one macroinstruction while the control processor is providing a new macroinstruction. Also included are three counters, namely 16-bit high address counter 187, 16-bit bit position address counter 188 and 16-bit low address counter 189.

Each high address register 181 and 182, as well as counter 186 contains the virtual address of the most significant bit (MSB) of an operand, while each low address register 183 and 184, as well as counter 189 holds the virtual address of the least significant bit (LSB) of the corresponding operand. Each initialization flag register 185 and 186 is set for each bit position address counter 188 that is to be initially loaded with the contents of the high address register, or cleared for each bit position address counter that is to be initially loaded with the contents of the low address register. Run signal 191 is set when the serializer is executing microcode and the d=dh signal 190 is set when the serializer is executing a microinstruction that loads the d counter 188 from the dh counter 187.

Figure 5:
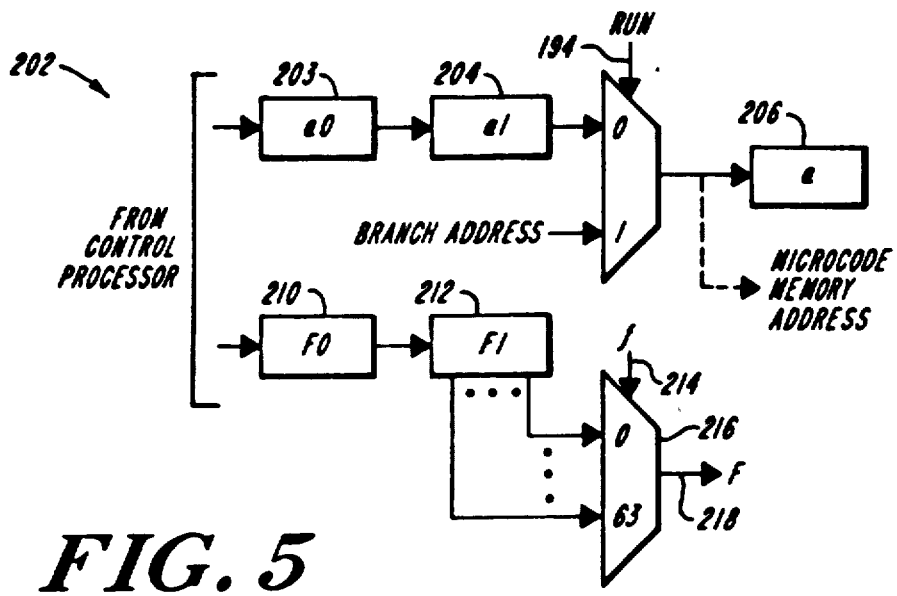
FIG. 5 is a more detailed block diagram of the microcode memory address generator and immediate operand bit extractor of the present invention.

In addition to the registers and counters in the five serializer address units shown in FIG. 4, the serializer receives information from the control processor via registers 202, FIG. 5. Microprogram address registers 203 and 204 and microprogram address counter 206 are loaded at the end of every serializer cycle. Memory register 206 is loaded from register 204 when the serializer starts executing microcode, and from a branch address generated by the microprogram while the serializer is running. As the serializer loads the microprogram memory address register 206 at the end of every serializer cycle, it also reads the data word from control processor data memory 114, FIG. 1, at the address that is being loaded into address register 206. This data is read into front end operand registers F0 and F1, 210 and 212, each of which is 64 bits wide. The low order 6 bits 214 of the f bit address counter from the f operand address unit select a bit in the F1 register via the 64-to-1 multiplexor 216 to be the current bit F, 218, of the front end parallel variable.

Figure 6:
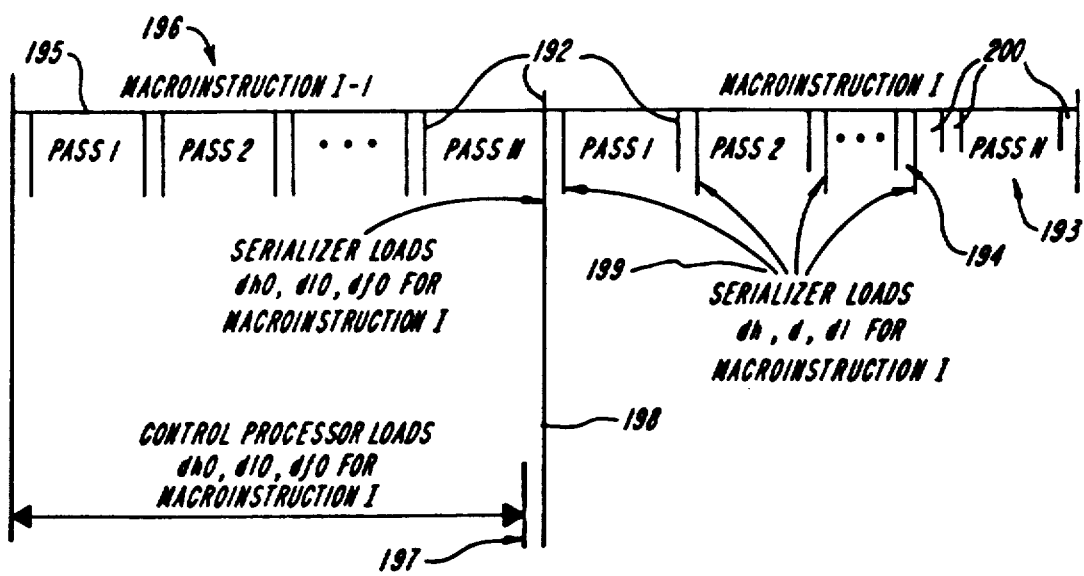
FIG. 6 is a timing diagram of the virtual processing address and instruction generator of this invention.

Timing of operand address unit 168 is illustrated in FIG. 6 wherein n is the number of virtual processors within the territory of each physical processor cell. The serializer executes the appropriate microcode for each macroinstruction received from the control processor n times, making one pass for each of the virtual processors. Vertical lines such as lines 192 represent selected boundaries between cycles at which time the serializer's registers and counters may be loaded with data or incremented. Each virtual processor pass such as pass 193 is preceeded by one clock cycle 194 during which the serializer produces a default nanoinstruction and initializes its working registers and counters for the subsequent pass.

The control processor loads the first set of serializer registers dh0, dl0, and df0 in the operand address units with the appropriate values for macroinstruction i between the time that the serializer begins the first virtual processor pass 195 for macroinstruction i-1 196 one clock cycle 197 before it completes the last pass for macroinstruction i-1. The serializer copies these values into the second set of pipelined registers dh1, dl1 and df1 when it completes the last virtual processor pass of macroinstruction i-1 as illustrated at time 198. The serializer then loads the three counters dh, d, and dl from the high and low address registers dh1 and dl1 at the end of each cycle 199 that preceeds each virtual processor pass for macroinstruction i. During the remaining cycles of each virtual processor pass, the serializer produces a nanoinstruction sequence for macroinstruction i by executing the selected microcode sequence for the macroinstruction, modifying the address counters for each virtual processor as directed by the microcode.

Each virtual processor pass such as pass 193 is comprised of a plurality of cycles 200. The serializer is designed to produce a useful nanoinstruction during each cycle.

The serializer can increment and decrement the contents of the three counters 187–189 in each operand address unit at the end of each serializer clock cycle 199. The ability to increment and decrement the counters such as bit position address counter 188 is necessary in order to sequentially address all the bit positions of an operand. The serializer microcode executed as a result of the macroinstruction received from the control processor directs whether the counters are to be incremented or decremented.

Figure 7A:
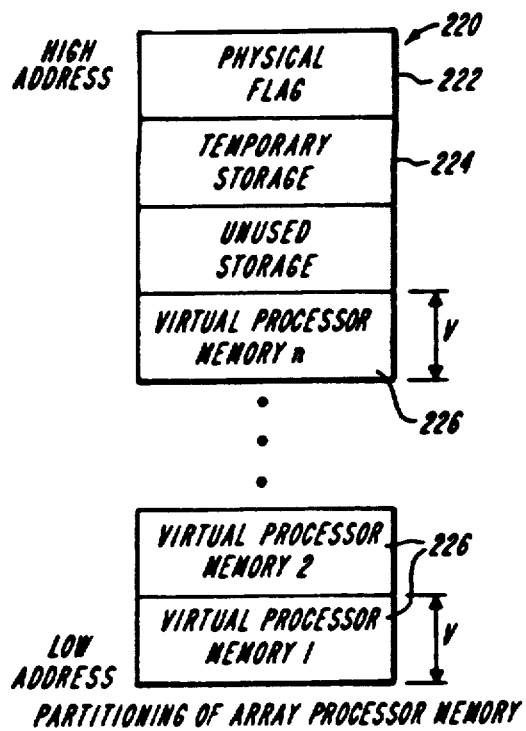
FIGS. 7A and 7B together diagram the partitioning of physical and virtual processor cell memory.

The memory of each physical processor is partitioned as shown in memory map 220, FIG. 7A. This memory map includes a physical flag segment 222 that contains flag bits that describe the physical processor's position within the processor array, as well as temporary memory storage area 224. The remaining memory is partitioned into $X_tY_tZ_t$ equal virtual processor memory areas 226, each V bits long.

Figure 7B:
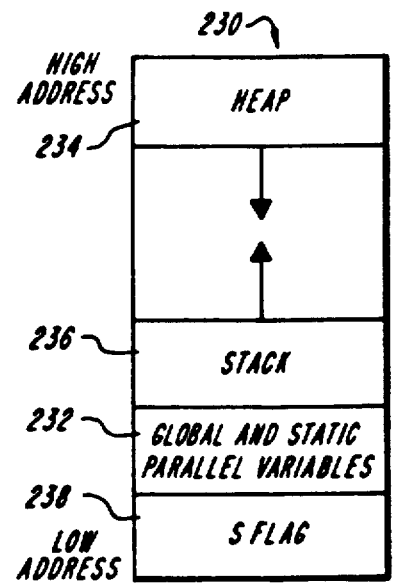

Each physical processor cell must execute every macroinstruction $X_tY_tZ_t$ times, once for each virtual processor in its territory. Memory map 230, FIG. 7B, illustrates the memory mapping of one virtual processor memory 226, V bits in length. The state of a given virtual processor 226 between macroinstructions is described by the values of all variables 232, the state of its heap 234 and stack 236, and the value of its S flag 238. The state of a virtual processor between nanoinstructions also includes the values in temporary storage 224, FIG. 7A which are needed to complete the macroinstruction, as well the state of every register in the physical processor.

Figure 8:
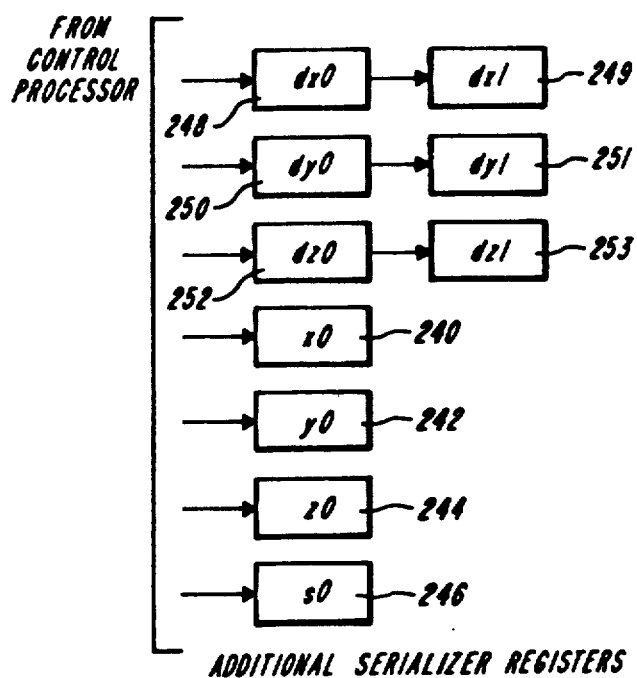
FIG. 8 is a block diagram of the address relocation control registers which form part of the address relocation circuit of FIG. 2.

To establish a virtual processing space, the control processor loads the four registers x0, y0, z0, and s0 240-246, FIG. 8, as follows, where V is the memory size of one virtual processor:

$x0 = X_tY_tZ_tV$
$y0 = Y_tZ_tV$
$z0 = Z_tV$
$s0 = V$

Data movement from one processor cell to another processor cell within the processor array is described according to the following syntax:

$a = [\Delta x; \Delta y; \Delta z]b$ wherein "a" is a location in the memory of the destination processor cell, and "b" is a location in the memory of the source processor cell. The source processor cell is located relative to the destination processor cell a by the coordinates $\Delta x$, $\Delta y$, and $\Delta z$.

Before processing macroinstructions which move data to and from more than one virtual processor, the control processor loads the three registers dx0, dy0 and dz0, 248-252, as follows:

$$dx0 = \left(\Delta x - X_t \left\lfloor \frac{\Delta x}{X_t} \right\rfloor \right) Y_t Z_t V$$

$$dy0 = \left(\Delta y - Y_t \left\lfloor \frac{\Delta y}{Y_t} \right\rfloor \right) Z_t V$$

$$dz0 = \left(\Delta z - Z_t \left\lfloor \frac{\Delta z}{Z_t} \right\rfloor \right) V$$

where $\Delta x$, $\Delta y$, and $\Delta z$ are the signed virtual processor coordinates for the source virtual processor relative to the distination virtual processor as shown in the operation $a = [\Delta x; \Delta y; \Delta z]b$. The expressions dx0, dy0 and dz0 represent the remainder of dividing each of the distances $\Delta x$, $\Delta y$, and $\Delta z$ by the appropriate territory dimension $X_t$, $Y_t$ and $Z_t$, respectively.

Figure 9:
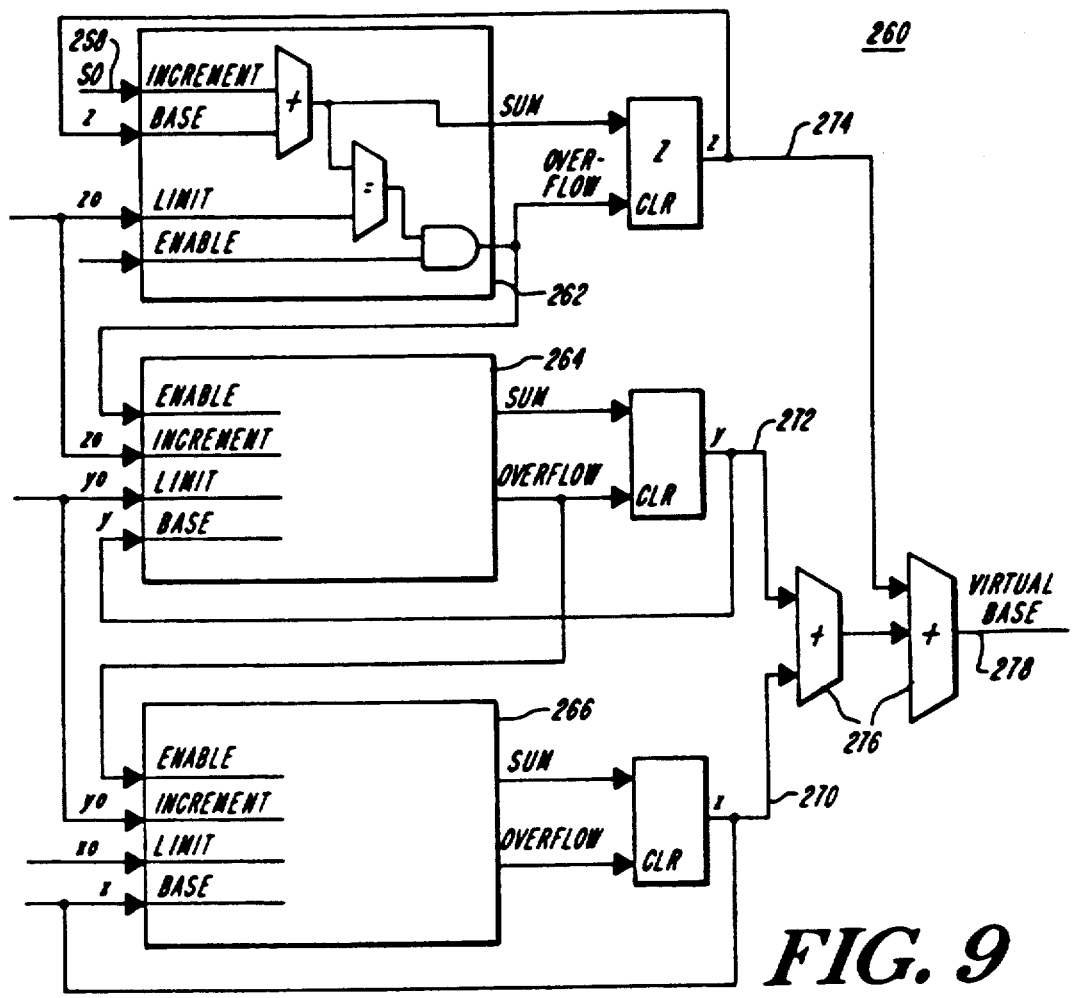
FIGS. 9 and 10 together are schematic representations of additional circuitry of the address relocation circuit of FIG. 2.

Address relocation circuit 162, FIG. 2 includes a relocation base generation circuit which is in turn comprised of a virtual base generation circuit and a remote base generation circuit. The virtual base generation circuit 260, FIG. 9, includes three modulo comparators 262, 264 and 266. The increment input 268 to the first modulo counter 262 is the value of the s0 register previously defined to contain the memory size V of a virtual processor. Each modulo counter is staged such that its increment and limit inputs are established as a function of the territory dimensions $X_t$, $Y_t$, and $Z_t$ of each physical processor cell. The resultant outputs X, Y, and Z, 270-274, are added together by adders 276 to produce the virtual base signal 278 which is subsequently added to the virtual address to produce the physical address in all processor cells of the array.

Figures 10, 11B:
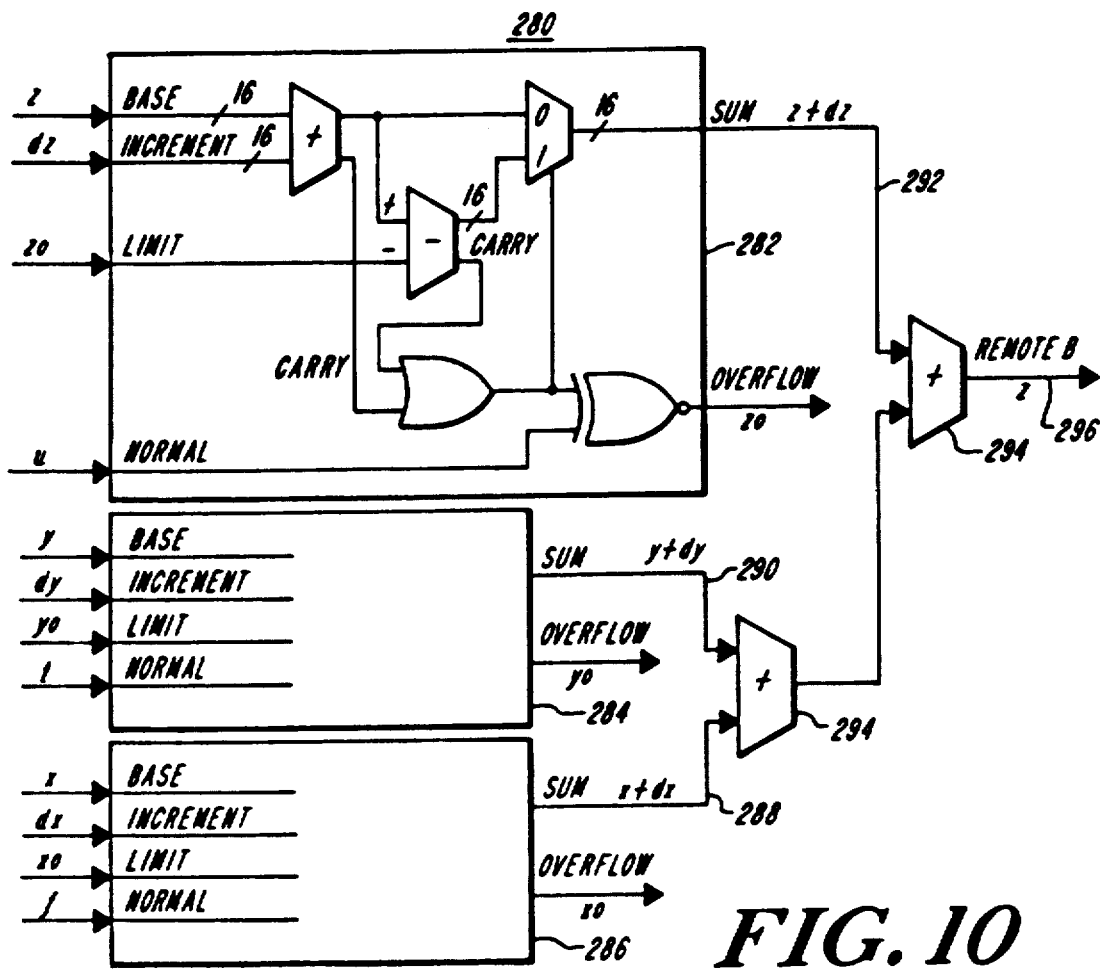

The remote base generation circuit 280, FIG. 10, includes three modulo adders 282, 284 and 286, one for each coordinate X, Y and Z. Each modulo adder generates a sum and overflow output. The sum output equals either: (a) base +increment if the base +increment is <limit; or (b) base +increment - limit, if the base +increment is <limit. The overflow signal is equal to the normal input if base +increment <limit, or to the complement of this input signal if base +increment <limit.

Microcode that implements interprocessor communication macroinstructions uses the F, T and U address units to count the number of physical processors that data is moved in the X, Y and Z directions, respectively. To describe the number of physical processors that data must be moved in each coordinate, the serializer initializes the operand address register units for the F, T, and U operands as follows:

$$f\!l\!0 = \begin{cases} 0, & \Delta x < 0 \\ 1, & \Delta x \geq 0 \end{cases}$$

$$t\!l\!0 = \begin{cases} 0, & \Delta y < 0 \\ 1, & \Delta y \geq 0 \end{cases}$$

$$u\!l\!0 = \begin{cases} 0, & \Delta z < 0 \\ 1, & \Delta z \geq 0 \end{cases}$$

$$f\!l\!0 = t\!l\!0 = u\!l\!0 = 1$$

$$fh0 = \begin{cases} \left\lfloor \frac{-1 - \Delta x}{X_t} \right\rfloor, & \Delta x < 0 \\ \left\lfloor \frac{\Delta x}{X_t} \right\rfloor, & \Delta x \geq 0 \end{cases}$$

$$th0 = \begin{cases} \left\lfloor \frac{-1 - \Delta y}{Y_t} \right\rfloor, & \Delta y < 0 \\ \left\lfloor \frac{\Delta y}{Y_t} \right\rfloor, & \Delta y \geq 0 \end{cases}$$

$$uh0 = \begin{cases} \left\lfloor \frac{-1 - \Delta z}{Z_t} \right\rfloor, & \Delta z < 0 \\ \left\lfloor \frac{\Delta z}{Z_t} \right\rfloor, & \Delta z \geq 0 \end{cases}$$

Each high address counter in the respective operand address unit is set to describe the distance that data is to be moved through the physical processor in the corresponding coordinate whenever the modulo adder for the coordinate does not overflow. Whenever the modulo adder for the associated coordinate does overflow, data is moved through one more physical processor. If data is to be moved in a positive coordinate direction, the bit position address counter of the respective address unit is initialized to the high address counter and counted down to the low address counter. If data is to be moved in a negative coordinate direction, the bit address counter is initialized to the low address counter and counted up to the high address counter. The output signals x+dx, y+dy and z+dz, 288-292 respectively, are added together by adders 294 to generate remote base signal 296.

At the beginning of each virtual processing pass, the microprogram and control unit 178, FIG. 2, adds the overflow bits x0, y0, and z0 to the high bit position address counters 187, FIG. 4, of the F, T, and U address units, respectively. Furthermore, for each coordinate in which data is to be moved in a positive direction, the corresponding overflow bit x0, y0, and z0 also added to the corresponding bit position address counter 188, FIG. 4. In this way, each of the F, T, and U address units is properly initialized to count the number of physical processor cell moves during each virtual processing pass.

Figure 11A:
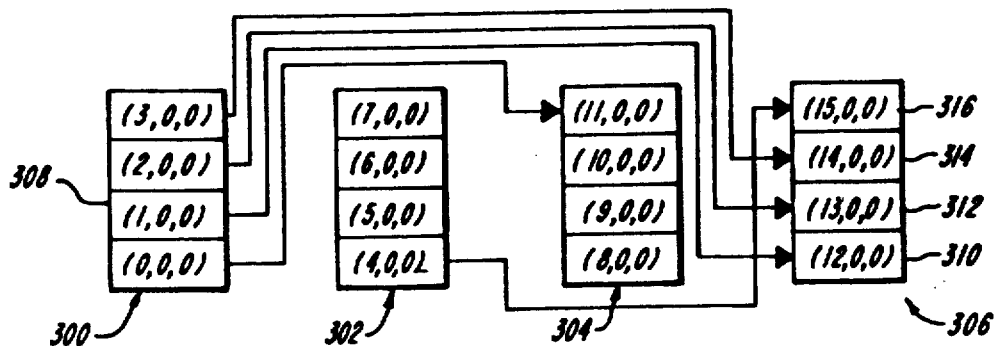
FIGS. 11A and 11B together describe an example of an interprocessor communication instruction.

By way of example, FIGS. 11A and 11B illustrate an interprocessor communication operation in the form of $a = [-11, 0, 0]b$ for physical processors 300-306 with territory dimensions of 4, 1, 1. As a result of initiating virtual processing, the control processor has loaded the s0, z0, y0, and x0 registers as follows to establish the territory dimensions of each physical processor cell, where V is the number of memory bits allocated to each virtual processor;

$x0 = 4V$ $y0 = V$ $z0 = V$ $s0 = V$

For this illustration, $\Delta x = -11$, $\Delta y = 0$, and $\Delta z = 0$.

The table in FIG. 11B outlines the key register and signal values for this operation during each virtual processor pass. During pass 1, the x register of the virtual base comparator circuit has been cleared and accordingly produces a virtual base of 0. The modulo adder circuit of the remote base generation circuit produces overflow signal x0 and accordingly, 1 is added to the f and fh register indicating that the source physical processor (e.g., 300) is three processors away from the destination physical processor (e.g., 306). The remote base (which relocates the source operand) is V, while the virtual base (which relocates the destination operand) is 0. This corresponds to data movement from virtual processor 308 which is within the territory of physical processor 300, to virtual processor 310 which is within the territory of physical processor 306. During the second virtual processing pass, the x register is incremented from 0 to V, yielding the source or remote base 2V, and the destination or virtual base V. On the fourth pass, the overflow bit x0 is zero, causing the f and fh registers not to be incremented at the beginning of the pass. Data is then moved through only two physical processors, from physical processor 302 to physical processor 306 and from physical processor 300 to physical processor 304.

Figure 12:
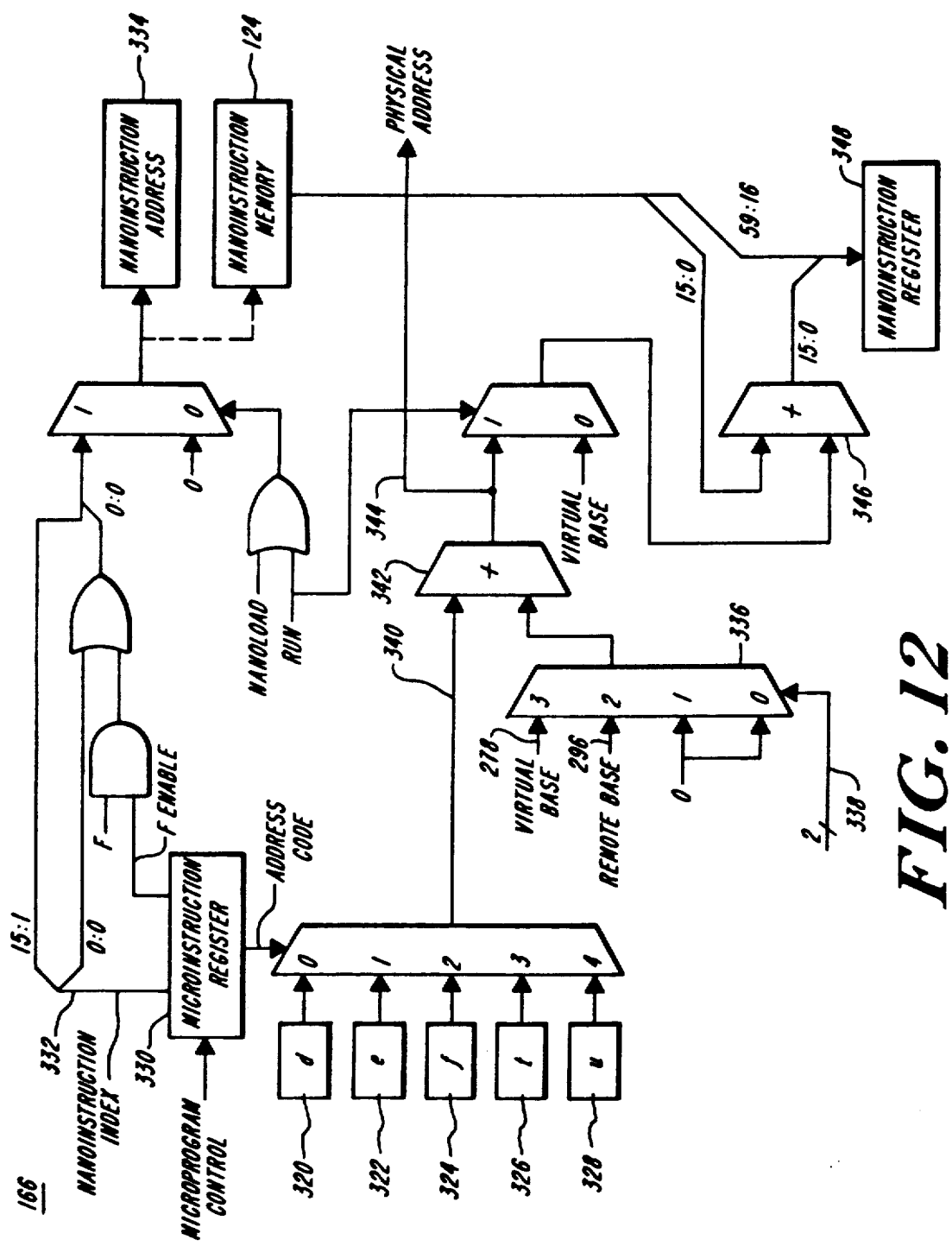
FIG. 12 is a more detailed block diagram of the nanoinstruction template and generator circuit of FIG. 2.

Nanoinstruction generation circuit 166, FIG. 2, is shown in greater detail in FIG. 12. This circuit produces nanoinstructions from the values of the five bit position address counters 320-328, virtual base 278, remote base 296, and the table of nanoinstructions stored in nanoinstruction memory 124. Under control of the microprogram, the microinstruction register 330 is loaded with nanoinstruction index bits 332 which produce a nanoinstruction address 334 pointing to the appropriate nanoinstruction template in nanoinstruction memory 124. Multiplexor 336, under control of signal 338 directs whether 0, remote base 296, or virtual base 278 is to be added to the selected bit operand address signal 340 by adder 342. The resulting output signal 344 from adder 342 is the physical address of the operand data which is added to the nanoinstruction by adder 346 and stored in nanoinstruction register 348 to be broadcast to each processor cell of the processor array at the beginning of the next serializer cycle.

Modifications and substitutions to the present invention by one of ordinary skill in the art are considered to be within the scope of the present invention and the claims which follow.

We claim:

1. A parallel processing system including a virtual processing instruction and address generator, for generating a plurality of processor cell instructions and corresponding physical processor cell operand memory addresses for a multi-dimensional processor array having at least one physical dimension that differs from a corresponding multi-dimensional problem dimension selectable from a plurality of multi-dimensional problem dimensions, comprising:

a multi-dimensional processor array including a predetermined number of physical processor cells arranged in a multi-dimensional array having predetermined dimensions, each physical processor cell having a predetermined amount of associated memory;

means for providing said plurality of selectable multi-dimensional problem dimensions;

means, responsive to the means for providing the plurality of selectable multi-dimensional problem dimensions and to the predetermined number of physical processor cells arranged in said multi-dimensional array having said predetermined dimensions, for assigning, for each dimension of said plurality of selectable multi-dimensional problem dimensions, a number of virtual processors to be associated with each of said predetermined number of physical processor cells, and for arranging, for each physical processor cell, said number of virtual processors in a predetermined multi-dimensional configuration as a function of said plurality of selectable multi-dimensional problem dimensions and of the predetermined number of physical processor cells, and for forming a multi-dimensional array of virtual processor cells having a plurality of multi-dimensional dimensions corresponding to said plurality of selectable multi-dimensional problem dimensions;

means, responsive to the means for assigning the number of virtual processors to be associated with each of said predetermined number of physical processor cells and to said arrangement of said number of virtual processors in a predetermined multi-dimensional configuration, for partitioning said predetermined amount of associated physical processor cell memory into a number of virtual processor memory segments corresponding to the number of virtual processors associated with each physical processor cell, for defining the address space of each virtual processor associated with each physical processor cell, and for defining, for each virtual processor, a physical processor cell memory address corresponding to a base virtual processor operand memory address defining the beginning operand memory address for each of said number of virtual processors associated with each physical processor cell;

means for providing one or more processor cell instructions, each of said processor cell instructions including operand address data;

means, responsive to said means for providing one or more processor cell instructions, for providing a virtual operand memory address for each operand to be processed by each virtual processor of said multi-dimensional array of virtual processors as directed by each processor cell instruction;

means, responsive to said means for providing each of said virtual operand memory addresses and to said means for defining said virtual processor base memory addresses, for summing each virtual operand memory address with a virtual processor base memory address, to produce a physical processor cell address relocated operand memory address for directly addressing within each physical processor cell, each virtual processor operand to be processed, and for any given processor cell instruction requiring operand data movement, for providing for each address relocated operand memory address, a value indicating the relative physical processor cell distance to be moved in each dimension;

means, responsive to said means for producing the physical processor cell address relocated operand memory address of each operand to be processed, and to said means for providing one or more processor cell instructions, for merging a processor cell instruction with a corresponding physical processor cell address relocated operand memory address, to produce an address relocated processor cell instruction to be broadcast to each virtual processor cell of the processor array.

2. The system of claim 1 wherein said multi-dimensional array includes a three-dimensional array.

3. The system of claim 1 wherein said means for providing the plurality of selectable multi-dimensional problem dimensions includes a front end processor.

4. The system of claim 1 wherein said means for defining a physical processor cell memory address corresponding to the base virtual processor operand memory address of each virtual processor, defines at least one of the base operand memory address of a source virtual processor from which an operand is to be fetched, and the base operand memory address of a destination virtual processor in which an operand is to be stored.

5. The system of claim 1 wherein each of said processor cell instructions includes at least a processor cell operand address segment including a virtual operand memory address and a processor cell instruction control segment.

6. The system of claim 5 wherein said means for merging a processor cell instruction with a corresponding physical processor cell address relocated operand memory address adds the physical processor cell address relocated operand memory address to the virtual operand address included in the address segment of a corresponding processor cell instruction.

7. The system of claim 1 wherein said system includes N virtual processors per physical processor cell; and further including means for executing each processor cell instruction N times.

8. The system of claim 7 wherein said means for executing each processor cell instruction changes the virtual processor base memory address N times, once for each of said N virtual processors per physical processor cell.

9. The system of claim 1 wherein said means for arranging said number of virtual processors in a predetermined, multi-dimensional configuration determines said predetermined, multi-dimensional virtual processor configuration by dividing the selectable multi-dimensional problem dimension to be solved by the multi-dimensional size of the multi-dimensional array of physical processor cells.

10. A parallel processing system including a virtual processing instruction and address generator, for generating a plurality of processor cell instructions and corresponding physical processor cell operand memory addresses for a multi-dimensional processor array having at least one physical dimension that differs from a corresponding multi-dimensional problem dimension selectable from a plurality of multi-dimensional problem dimensions, comprising:

a multi-dimensional processor array including a predetermined number of physical processor cells arranged in a multi-dimensional array having predetermined dimensions, each physical processor cell having a predetermined amount of associated memory;

means for providing said plurality of selectable multi-dimensional problem dimensions;

means, responsive to the means for providing the plurality of selectable multi-dimensional problem dimensions and to the predetermined number of physical processor cells arranged in said multi-dimensional array having said predetermined dimensions, for assigning, for each dimension of said plurality of selectable multi-dimensional problem dimensions, a number of virtual processors to be associated with each of said predetermined number of physical processor cells, and for arranging, for each physical processor cell, said number of virtual processors in a predetermined multi-dimensional configuration as a function of said plurality of selectable multi-dimensional problem dimensions and of the predetermined number of physical processor cells, and for forming a multi-dimensional array of virtual processor cells having a plurality of multi-dimensional dimensions corresponding to said plurality of selectable multi-dimensional problem dimensions;

means, responsive to the means for assigning the number of virtual processors to be associated with each of said predetermined number of physical processor cells and to said arrangement of said number of virtual processors in a predetermined multi-dimensional configuration, for partitioning said predetermined amount of associated physical processor cell memory into a number of virtual processor memory segments corresponding to the number of virtual processors associated with each physical processor cell, for defining the address space of each virtual processor associated with each physical processor cell, and for defining, for each virtual processor, a physical processor cell memory address corresponding to a base virtual processor operand memory address defining the beginning operand memory address for each of said number of virtual processors associated with each physical processor cell, said base virtual processor operand memory address including at least one of a base virtual processor source operand memory address, defining a source virtual processor from which an operand is to be fetched, and a base virtual processor destination operand memory address defining a destination virtual processor in which an operand is to be stored;

means for providing one or more processor cell instructions, each of said processor cell instructions including operand address data;

means, responsive to said means for providing one or more processor cell instructions, for providing a virtual operand memory address for each operand to be processed by each virtual processor of said multi-dimensional array of virtual processors as directed by each processor cell instruction;

means, responsive to said means for providing each of said virtual operand memory addresses and to said means for defining said virtual processor base memory addresses, for summing each virtual operand memory address with a virtual processor base memory address, to produce a physical processor cell address relocated operand memory address for directly addressing within each physical processor cell, each virtual processor operand to be processed, and for any given processor cell instruction requiring operand data movement, for providing for each address relocated operand memory address, a value indicating the relative physical processor cell distance to be moved in each dimension;

means, responsive to said means for producing the physical processor cell address relocated operand memory address of each operand to be processed, and to said means for providing one or more processor cell instructions, for merging a processor cell instruction with a corresponding physical processor cell address relocated operand memory address, to produce an address relocated processor cell instruction to be broadcast to each virtual processor cell of the processor array.

* * * * *